United States Patent [19]

Nakata et al.

[11] 4,425,452

[45] Jan. 10, 1984

[54] COATING COLOR FOR PAPER AND METHOD FOR PREPARATION OF THE SAME

[75] Inventors: Kojiro Nakata; Yasunobu Endo, both of Fuji; Akitomo Terada, Shiki; Kazumasa Hayashi; Michio Kobori, both of Kashiwara, all of Japan

[73] Assignees: Sanwa Denpun Industrial Co., Ltd., Kashiwara; Shizuoka Prefecture, Shizuoka, both of Japan

[21] Appl. No.: 311,172

[22] Filed: Oct. 14, 1981

[30] Foreign Application Priority Data

Oct. 17, 1980 [JP] Japan .................................. 55-145094

[51] Int. Cl.$^3$ ............................ C08L 3/04; C08L 3/00
[52] U.S. Cl. ........................................ 524/47; 524/52; 106/213; 106/214
[58] Field of Search ....................... 106/210, 213, 214; 127/32; 524/47, 52

[56] References Cited

U.S. PATENT DOCUMENTS

| 2,394,233 | 2/1946 | Craig | 106/214 |
| 3,137,592 | 6/1964 | Protzman et al. | 127/32 |
| 3,450,549 | 6/1969 | Schwalbe | 127/32 |
| 3,498,882 | 3/1970 | Rogols et al. | 106/210 |
| 3,869,296 | 3/1975 | Kelly et al. | 106/214 |
| 4,196,012 | 4/1980 | Windle | 106/214 |

*Primary Examiner*—Theodore Morris
*Attorney, Agent, or Firm*—Lyon & Lyon

[57] ABSTRACT

Coating color and method for providing an excellent coating condition and paper quality through steps comprising a direct addition of enzymatically converted powdered or granulated dry starch to an aqueous suspension of pigments. The dry starch is soluble and impasted in the cold aqueous suspension of pigments without impastation heat and/or other equipment.

14 Claims, No Drawings

COATING COLOR FOR PAPER AND METHOD FOR PREPARATION OF THE SAME

BACKGROUND OF THE INVENTION

This invention relates to a coating color for paper to improve brightness, smoothness, gloss, ink receptivity and the like of the paper. More particularly, this invention relates to a coating color having a low viscosity despite a high solid content, and a method for preparation thereof.

A conventional coating color is prepared by the following steps:

(1) heating a starch slurry containing about 30% by weight of starch such as oxidized starch, aminophosphate esterification starch, hydroxyethyl starch or the like and about 70% by weight of water, over 70° C. for about 20 minutes to impaste within a starch-impasting tank thereby obtaining the impasted starch with a concentration of about 20% to 30% by weight, or enzymatically impasting a starch slurry therein to obtain the enzymatically converted starch with a concentration of about 10% to 35%, (2) preparing an aqueous pigment-suspension by a mixture of, for example, 70 parts by weight of a pigment of clay with 30 parts by weight of water within a pigment-dispersing tank, and (3) Mixing the impasted starch slurry with the pigment suspension within a coating-color preparation tank.

The large amount of water necessary to impaste the starch causes a decrease in the solid concentration of the coating color. The removal of excess water in the manufacture of the coated paper is extremely expensive and energy consuming because of necessary drying equipment and the large floor space required for such. The heating of the starch slurry to impaste the starch is also energy consuming. Moreover, these processes are labor consuming.

In order to decrease the large amount of water for impasting the starch, an approach for converting the starch with enzymes in the presence of pigments is disclosed by James P. Casey, "Pulp and Paper, Chemistry & Chemical Technology" Vol. 2, P.1020-1025 (1952). Another approach for converting the starch with enzymes in the presence of the total amount of water to be used in the coating color and adding pigments to the starch after conversion, is also proposed by him in the same article. However, both of those approaches still have the drawback that a large amount of water must be heated and the entire batch of starch and pigments must be cooled before use.

SUMMARY OF THE INVENTION

The paper-coating color and method of this invention which overcomes the above discussed and numerous other drawbacks and deficiencies of the prior art, relates to a paper-coating color having a low viscosity despite a high solid content and a method for preparation of the same comprising: the direct addition of about 1 part to about 50 parts by weight of enzymatically converted powdered or granulated starch to an aqueous suspension containing 100 parts by weight of pigments.

The enzymatically converted starch is prepared by:

(1) adjusting the specific gravity of a starch slurry to a range from about 15 to about 24 degrees Baume, (2) adding alkali to said starch slurry to adjust to a pH of about 6-7, (3) adding α-amylase with a concentration ranging from about 0.05% to about 1% by weight to said starch slurry, (4) heating the mixture to be impasted to a temperature ranging from about 70° C. to about 100° C., (5) subjecting the resulting paste to an enzymic conversion at a temperature ranging from about 70° C. to about 100° C. for a period ranging from about 0.5 to about 10 hours, (6) inactivating said enzyme, (7) drying said paste, and (8) passing said dry paste through a sieve to thereby yield powdered or granulated paste.

Thus, the invention described herein makes possible the objectives of:

(a) providing a coating color of a low viscosity despite a high solid content, and a method for preparation of the same, (b) providing a coating color prepared by direct addition of powdered or granulated dry starch to an aqueous suspension of pigments, (c) providing a coating color containing enzymatically converted starch which requires neither impasting equipment nor impasting heat energy because the starch is soluble and impasted in a cold aqueous suspension of pigments, and (d) providing a coating color which decreases the heat energy needed for drying when coated on paper due to the high solid content thereof.

DESCRIPTION OF THE PREFERRED EMBODIMENTS

A coating color according to this invention comprises 100 parts by weight of pigments, about 1 part to 50 parts by weight, preferably about 3 parts to 30 parts by weight, of starch which is converted with enzymes in advance, insolubilizers and water.

Some examples of pigments are kaolin, clay, talc, barium sulfate, calcium sulfate, calcium carbonate, satin white, alminium hydroxide, titanium dioxide, calcium sulfite, zinc oxide and the like. One or more of the above pigments are suspended into water to prepare a pigment suspension. A dispersion agent or agents may be used for the preparation of the pigment suspension, some examples of which are sodium polyacrylate, sodium ligninsulphonate, phosphorate, olefineanhydrous maleic acid copolymer, sodium citrate and sodium succinate.

The starch used in this invention has the physical properties of a moisture level of 20% or less by weight; crude protein of 2.0% or less by weight; crude fat of 1.0% or less by weight; crude ash of 1.0% or less by weight; a dextrose equivalent of 20% or less by weight; viscosity of the suspention of said starch with a concentration of 30% by weight is 3,000 c.p. or less, preferably 1,000 c.p. or less. This starch is prepared as follows:

A starch slurry deriving from corn, potatoes, sweet potatoes, wheat, rice, tapioca, sagos, or the like, is adjusted to a specific gravity ranging from about 15 to about 24 degrees Baume followed by the addition of alkali, e.g. calcium hydroxide, to adjust the pH of the starch slurry to about 6-7. As an enzyme α-amylase is then added to the slurry with a concentration ranging from about 0.05% to about 1% by weight. The mixture is heated to a temperature ranging from about 70° C. to about 100° C. to cause impasting, and is subjected to an enzymatic conversion at the same temperature for a period ranging from about 0.5 to about 10 hours. Thereafter, the enzyme is inactivated by, for example, heating the reactant to a temperature ranging from 110° C. to 150° C. The resulting paste containing enzymatically converted starch is dried by means of spray drying or the like to form dry paste, which is passed through a 20 mesh sieve to remove solid mass.

As the insolubilizers, dialdehyde compounds, polyalkylene ureas, polyamide ureas, formaldehyde, N-methylol compounds, soluble condensed N-methylol compounds, epoxy compounds or the like may be used. Some examples of dialdehyde compounds are glyoxal and glutaldehyde. Polyalkylene ureas are formed by a deammonia reaction of urea with diethylenetriamine, triethylenetetramine, tetraethylene pentamine, imino bis-propylamin or the like. Polyamide ureas are formed by a reaction of urea with polyamide; polyamides are formed by condensation of, for example, dicarbonic acid such as adipinic acid, phthalic acid or the like, and polyalkylene polyamine. Some examples of N-methylol compounds are methylol melamines, such as trimethylol melamine and trimethylol melamine dimethyl ether, partially alkilated methylol melamines, methylol ureas, and methylolcyclic ureas such as dimethylol ethylene urea and dimethylol glyoximonourea. The condensed N-methylol compounds are compounds which are formed by condensation of N-methylol compounds without loss of their solubilization. Some examples of epoxy compounds are glycerol polyglycidyl ether, trimethyl propanol polyglycidyl ether, diglycerol polyglycidyl ether and sorbitol polyglycidyl ether.

The coating color according to this invention may further contain synthetic latices, which serve to improve a binding tightness among pigment particles, a binding tightness between pigment particles and paper, and a water resistancy and gloss of the final coated paper. As synthetic latices, diene derivative polymers, acryl derivative polymers, vinyl acetate derivative polymers, diene derivative polymers having a modified functional group, acryl derivative polymers having a modified functional group, vinyl acetate derivative polymers having a modified functional group and the like, and a mixture or mixtures thereof is used. Some examples of diene derivative polymers are styrene-butadiene copolymer and methylmethacrylate-butadiene copolymer. Some examples of acryl derivative polymers are polymers or copolymers of acrylic acid ester and/or metacrylic acid ester. An example of vinyl acetate derivative polymers is ethylene-vinyl acetate copolymer.

The coating color may further contain auxiliary agents such as dispersing agents, leveling agents, foam killers, dyestuffs, lubricating agents, water retention aids, and the like.

The coating color according to this invention is prepared by the direct addition of the aforementioned enzymatically converted dry starch to the pigment suspension, and thus, the coating color is in a high concentration. Despite such a high concentration, the coating color is fluid and its viscosity is low. The high concentration and low viscosity result in the following advantages in the coating process:

(a) Normal flow of the coating color can be retained at the tips of the blades of the coating apparatus, (b) The tips of these blades can be kept clean, (c) Neither streak troubles nor roll patterns occur on the resulting coated paper, (d) The resulting coated paper has an excellent smoothness, gloss, ink receptivity and the like, and (e) Mottles are reduced on the resulting coated paper.

The following examples of experiments which have been carried out and have given excellent results are given to illustrate this invention.

EXAMPLE 1

A starch slurry, which was taken out of the final process of preparation of corn starch, was adjusted to a Bé of 20 followed by the addition of calcium hydroxide to adjust the pH of the slurry to 6–7. α-amylase 10,000 units/g, available from Daiwa Kasei Co., Ltd., was then added with a concentration of about 0.3% by weight on the basis of the starch (anhydride). The mixture was heated at approximately 90° C. to impaste and subjected to an enzymic conversion at the same temperature for 2 hours. Thereafter, the mixture was heated to 125° C. under pressure to inactivate the enzyme. The resulting paste containing enzyme-converted starch was subjected to a spray drying process and passed through a sieve (20 mesh) to obtain powdered starch, the physical properties of which are shown in Table 1.

TABLE 1

| Items | Qualities & Properties | Measurements |
|---|---|---|
| Moisture | Below 10% | Brabender Rapid Moisture Tester |
| Crude Protein | Below 0.5% | Kjeldahl Nitrogen × 6.25 |
| Crude Fat | Below 0.3% | Soxhlet Extraction |
| Crude Fiber | Below 0.2% | Dilute Acid · Dilute Alkali-Treatment |
| Crude Ash | Below 0.5% | Ashing at 600 ± 50° C. for 5 hrs |
| Dextrose Eq. | 10 ± 2% | Determined as Glucose, on Basis of Solid Components |
| pH | 6–7 | pH of 5% Suspention |
| Heavy Metal (As Pb) | Below 5 ppm | Sodium Sulfide Colorimetry Method |
| Arsenic (As $AS_2O_3$) | Below 1 ppm | Silver Carbamate Method |
| Viscosity | 40 ± 10 cp | 30% Suspension by Brook Field Viscometer at 30° C. |
| Grain Size | Over 99.5% Passed Through 840μ | JIS size |
| Appearance | White or Pale Yellow Color, Granules | |

EXAMPLE 2

(a) Preparation of a 70% pigment-suspension

One hundred parts by weight of No. 1 Kaolin (EMC CO., UW-90) as a pigment and 0.2 parts by weight of sodium polyacrylate as a dispersing agent were suspended in water, resulting in the formation of a pigment suspension with a concentration of 70% by weight.

(b) Preparation of a coating color

Twenty parts by weight of the granulated starch which was prepared in Example 1, was directly mixed, by use of a stirrer, to a given amount of the above pigment suspension at an ambient temperature. The mixture was stirred at 550 rpm for 20 minutes to impaste. A certain amount of calcium stearate which is used as a lubricating agent in calender processing, was then added to the mixture. The resulting mixture was aged on additional 30 minutes to yield the desired coating color, the composition of which is as follows:

Kaolin (UW-90): 100 parts by weight

Sodium Polyacrylate: 0.2 parts by weight
Starch (Solid): 20 parts by weight
Calcium Stearate: 1.5 parts by weight (c) Manufacture of coated paper The coating color made above was applied to a surface of base paper of a basic weight of 68 g/m² using an R.D.C. Laboratory Coating Rod. Upon coating, the coated paper was dried at 105° C. for 3 minutes within a dryer and subjected to a calender treatment three times at 55° C. under a wire pressure of 100 kg/cm using a super calender available from URI ROLL Co. The resulting coated paper was subjected to a moisture adjustment to bring the moisture level to 65% followed by an examination of the qualities and properties. The results are shown in Table 2.

(d) Preparation of control coating color

A certain amount of Amino phosphoric acid esterification starch, available on the market, was dissolved in water at 95° C. for 20 minutes to prepare a paste with a 30% concentration. After cooling, the paste was added to the 70% pigment (kaolin) suspension prepared above, by the same process described in (b) above, resulting in the formation of the desired control coating color. According to the same technique as in the abovementioned, the control coating color was used to make control coated-paper, the qualities and properties of which are shown in Table 2.

EXAMPLE 3

A certain amount of the granulated starch obtained as in Example 1 was dissolved in hot water (50° C.) to form a 30% paste, which was added to the 70% Kaolin suspension as prepared in Example 2. The coating color having the same composition as in Example 2 and coated paper were prepared through the same procedures as in Example 2. The results are shown in Table 2.

EXAMPLE 4

A certain amount of the granulated starch was directly added, using a strrer, to the 70% kaolin suspension as prepared in Example 2. The 70% kaolin suspension was heated to 50° C. in advance. Coating color of the same composition as in Example 2 and coated paper were prepared according to the same technique as in Example 2. The results are shown in Table 2.

TABLE 2

|  | Example 2 | Example 3 | Example 4 | Control |
|---|---|---|---|---|
| Coating Color |  |  |  |  |
| Solid Content (%) | 50.2 | 50.3 | 50.2 | 45.2 |
| Brook field Viscosity (CPS) |  |  |  |  |
| Just After Preparation (60rpm) | 70 | 63 | 63 | 2140 |
| 24 Hrs After Preparation (60rpm) | 78 | 96 | 88 | 2840 |
| High Shear Viscosity (4400rpm) | 22.0 | 20 | 20 | 56 |
| Water Retention Value (sec) | 25.1 | 22.8 | 21.0 | 24.5 |
| Coated Paper |  |  |  |  |
| Coated Amount (g/m²) | 19.1 | 18.2 | 18.6 | 18.6 |
| IGT Pick Strength (cm/sec) | 71 | 60 | 55 | 224 |

As seen from Table 2, the solid content of the coating colors in Examples 2,3 and 4 is higher than that of the control color, but the viscosity of the colors in Examples 2,3 and 4 is, nevertheless, much lower than that of the control color. The colors in these Examples are also excellent in high shear viscosity when compared with the control color. The surface strength (ITG pick strength) of the colors in these Examples is inferior to that of the control color. In addition, it is found that the preparation of the coating color according to Example 2 wherein a direct addition of the starch to the pigment suspension was carried out, is the simplest and cost efficient of the three processes explained in Examples 2,3 and 4.

EXAMPLE 5

As an adhesive, a modified styrene-butadiene copolymer latex was employed in addition to the starch as prepared in Example 1 in order to improve the pick strength of the final coated paper. Twenty parts by weight of the total amount of the starch and the latex was used to 100 parts by weight of kaolin. The starch was directly added to the 70% kaolin suspension, as prepared in Example 2, in a proportion ranging from 75% to 15% by weight of the total amount of the starch and the latex. The latex was then added in a proportion ranging from 25% to 85% by weight of the same. The resulting mixture was adjusted to a pH of 9 by ammonium hydroxide followed by the addition of an adequate amount of diluting water resulting in a coating color with a 50% solid content, the composition of which was as follows:

| Kaolin (UW-90) | 100 parts by weight |
|---|---|
| Sodium Polyacrylate | 0.2 parts by weight |
| Starch (Solid) Styrene-Butadiene Copolymer Latex (Japan Synthetic Gum Co.: JSR#0692) | 20 parts by weight |
| Calcium Stearate | 1.5 parts by weight |
| Ammonium Hydroxide | adequate amount. |

The above coating color was used to prepare coated paper according to the same technique as in Example 2. A control coating color was prepared through the same procedures as for the control coating color in Example 2 and used to form control coated-paper according to the same technique as in Example 2. The results are shown in Table 3.

TABLE 3

|  | Example 5 | | | | | Control | | | | |
|---|---|---|---|---|---|---|---|---|---|---|
|  | 1 | 2 | 3 | 4 | 5 | 1 | 2 | 3 | 4 | 5 |
| Proportion of Adhesives |  |  |  |  |  |  |  |  |  |  |
| Starch | 75 | 50 | 35 | 25 | 15 | 75 | 50 | 35 | 25 | 15 |
| Latex | 25 | 50 | 65 | 75 | 85 | 25 | 50 | 65 | 75 | 85 |
| Coating Color |  |  |  |  |  |  |  |  |  |  |
| Solid Content (%) | 50.3 | 50.3 | 49.8 | 50.0 | 49.7 | 49.9 | 49.6 | 49.7 | 49.8 | 49.6 |
| Brook Field Viscosity (CPS) |  |  |  |  |  |  |  |  |  |  |
| Just After Preparation (60rpm) | 78 | 51 | 45 | 40 | 35 | 1.500 | 351 | 300 | 149 | 91 |
| 24 hrs After Preparation (60rpm) | 139 | 63 | 33 | 31 | 34 | 1,835 | 704 | 309 | 171 | 100 |

TABLE 3-continued

|  | Example 5 | | | | | Control | | | | |
| --- | --- | --- | --- | --- | --- | --- | --- | --- | --- | --- |
|  | 1 | 2 | 3 | 4 | 5 | 1 | 2 | 3 | 4 | 5 |
| High Shear Viscosity (8,800rpm) | 9.5 | 10.6 | 9.4 | 9.0 | 9.0 | 27.0 | 16.0 | 12.8 | 9.7 | 9.5 |
| pH | 8.8 | 9.2 | 8.9 | 9.0 | 8.9 | 8.7 | 8.6 | 8.6 | 8.6 | 8.8 |
| Water Retention Value (sec) | 8.6 | 11.2 | 4.6 | 4.5 | 4.7 | 23.9 | 14.4 | 13.7 | 12.7 | 11.1 |
| Coated Paper |  |  |  |  |  |  |  |  |  |  |
| Coated Amount (g/m$^2$) | 18.0 | 17.7 | 17.9 | 18.8 | 17.6 | 17.7 | 18.3 | 18.5 | 19.4 | 17.7 |
| Sheet Gloss (%) | 74.7 | 80.3 | 80.2 | 78.7 | 81.6 | 66.8 | 69.9 | 70.3 | 73.5 | 74.5 |
| Brightness (%) | 78.3 | 78.6 | 78.0 | 78.3 | 78.1 | 79.4 | 78.1 | 77.8 | 77.8 | 78.7 |
| Opacity (%) | 88.2 | 87.9 | 87.6 | 88.0 | 87.5 | 88.8 | 87.4 | 87.3 | 87.1 | 86.9 |
| Smoothness (sec) | 3.200 | 3.600 | 5.700 | 6.200 | 7.700 | 2.700 | 4.800 | 5.300 | 5.600 | 6.700 |
| Air Permeability (sec) | 4.400 | 7.800 | 15.000 | 18.000 | 36.000 | 7.400 | 18.000 | 22.000 | 26.000 | 34.000 |
| Printability of Coated Paper |  |  |  |  |  |  |  |  |  |  |
| K & N Ink Receptability (%) | 22.0 | 18.0 | 15.7 | 15.8 | 16.1 | 18.1 | 16.5 | 14.9 | 14.2 | 14.3 |
| Printed Gloss (%) | 73.7 | 86.3 | 89.6 | 89.5 | 88.2 | 80.2 | 90.0 | 90.3 | 89.4 | 91.0 |
| Printed Ink Density | 1.83 | 2.25 | 1.93 | 1.91 | 1.95 | 2.19 | 1.97 | 1.99 | 1.99 | 2.01 |
| ITG Pick Strength (cm/sec) | 38 | 60 | 95 | 106 | 115 | 49 | 84 | 80 | 107 | 114 |
| RI Pick Strength (Dry) | 2 | 3 | 3.5 | 4 | 5 | 3 | 3 | 3.5 | 4 | 5 |
| RI Pick Strength (Wet) | 3.5 | 4 | 4 | 4 | 4 | 3 | 4 | 4 | 4 | 4 |

As seen from Table 3, the solid content of the coating color in Example 5 is almost identical to that of the control color. The viscosity of the coating color in Example 5 is nevertheless extremely low when compared with that of the control color. The high shear viscosity of the color in Example 5 is also improved. The addition of the latex results in a decrease in the water retention of the coating color; this tendency becomes more apparent as the amount of the latex increases. The sheet gloss of the coated paper is superior to that of the control. The K & N ink receptibity, given as an indication of the printability of the coated paper, is also superior to that of the control. The IGT pick strength of the coated paper is almost identical to that of the control when the proportion of the amount of latex is over 50% by weight.

EXAMPLE 6

In this example, an insolubilizer was used in order to improve the water resistance of the final coated paper.

Using the granulated starch and the 70% kaolin suspension as obtained in Example 2, a coating color was prepared according to the same technique as in Example 5 except for the use of an insolubilizer, a melamine derivative resin (Sumitomo chemical Industry; Sumirettsu Resin #613). The composition of the resulting coating color was as follows:

| | |
| --- | --- |
| Kaolin (UW-90) | 100 parts by weight |
| Sodium Polyacrylate | 0.2 parts by weight |
| Starch (Solid) | 10 parts by weight |
| Latex (JSR#0692) | 10 parts by weight |
| Calcium Stearate | 1.5 parts by weight |
| Melamine Derivative Resin (Insolubilizer) | 5-15% by weight (on basis of starch) |
| Ammonium Hydroxide | adequate amount |

Using the above coating color, a coated paper was prepared according to the same technique as in Example 5. The preparation of the control coating color was also the same as that of in Example 5 except for the use of an insolubilizer, a melamine derivative resin. The experimental results are shown in Table 4.

EXAMPLE 7

The coating color was the same composition as in Example 6, except for the use of an epoxy derivative resin (Nagase and Co., Ltd; Denacall #PC-1000) as an insolubilizer. As an insolubilizer in the control coating color the epoxy derivative resin (Denacoal #PC-1000) was likewise used. The experimental results are shown in Table 4.

Table 4 indicates that the use of those insolubilizers increases the water resistancy of the coated paper (especially, 7 days after coating), which is almost identical to that of the control.

TABLE 4

|  | Example 6 | | | Example 7 | | | Control | |
| --- | --- | --- | --- | --- | --- | --- | --- | --- |
|  | 1 | 2 | 3 | 4 | 5 | 6 | 1 | 2 |
| Insolubilizers |  |  |  |  |  |  |  |  |
| Melamine Derivative Resin (Sumirettsu Resin#613) | 5 | 10 | 15 | 0 | 0 | 0 | 10 | 0 |
| Epoxy Derivative Resin (Denacall pc-1000) | 0 | 0 | 0 | 5 | 10 | 15 | 0 | 10 |
| Coating Color |  |  |  |  |  |  |  |  |
| Solid Content (%) | 50.6 | 50.4 | 50.7 | 50.3 | 50.6 | 50.7 | 50.0 | 49.6 |
| Brook field Viscosity (CPS) |  |  |  |  |  |  |  |  |
| Just After Preparation (60rpm) | 55 | 48 | 56 | 49 | 50 | 57 | 428 | 440 |
| 24 hrs After Preparation (60rpm) | 66 | 61 | 61 | 59 | 58 | 111 | 836 | 640 |
| High Shear Viscosity (8,800rpm) | 10.8 | 10.0 | 10.5 | 10.0 | 10.5 | 13.0 | 18.0 | 17.4 |
| pH | 9.0 | 8.7 | 8.9 | 8.9 | 8.9 | 8.9 | 9.0 | 9.0 |
| Water Retention Value (sec) | 14.8 | 16.0 | 16.3 | 13.7 | 18.1 | 19.8 | 26.5 | 24.0 |
| Coated Paper |  |  |  |  |  |  |  |  |
| Coated Amount (g/m$^2$) | 19.2 | 18.2 | 17.8 | 18.2 | 18.0 | 18.5 | 18.4 | 18.0 |
| Sheet Gloss | 79.9 | 79.1 | 78.0 | 80.0 | 79.5 | 80.0 | 67.8 | 68.0 |
| IGT Pick Strength (cm/sec) | 73 | 77 | 72 | 74 | 77 | 74 | 83 | 79 |

TABLE 4-continued

|  | Example 6 | | | Example 7 | | | Control | |
| --- | --- | --- | --- | --- | --- | --- | --- | --- |
|  | 1 | 2 | 3 | 4 | 5 | 6 | 1 | 2 |
| Water resistancy |  |  |  |  |  |  |  |  |
| (Wet Rub Method) 2 Days After Coating | 45.5 | 39.0 | 39.5 | 97.5 | 95.5 | 96.0 | 84.5 | 95.5 |
| 7 Days After Coating | 92.0 | 95.0 | 99.0 | 99.0 | 99.0 | 100 | 100 | 100 |
| (RI Wet Pick Method) 2 Days After Coating | 3.3 | 3.3 | 3 | 3.3 | 3.3 | 3.7 | 3 | 3.7 |
| 7 Days After Coating | 4 | 5 | 5 | 3 | 3 | 4 | 5 | 4 |

EXAMPLE 8 AND 9

In these examples, the effects of quantity on adhesives and diluting water needed in preparation of the coating color were examined.

In Example 8, 15 parts by weight of the adhesives, including 35% by weight of the granulated starch as prepared in Example 1 and 65% by weight of the latex as used in Example 5, were added to 100 parts by weight of kaolin. The amount of the granulated starch was directly added to the 70% kaolin suspension in the same manner as in Example 2 and the same procedure as in Example 7, No. 5, were carried out to thereby yield the desired coating color, the solid content of which was 62% by weight in the presence of diluting water and 67.7% by weight in the absence of diluting water. The composition of the coating color is briefly shown below:

| Kaolin (UW-90) | 100 parts by weight |
| --- | --- |
| Sodium Polyacrylate | 0.2 parts by weight |
| Starch | } 15 parts by weight |
| Latex |  |
| Calcium Stearate | 1.5 parts by weight |
| Epoxy Derivative Resin (Denacall#PC-1000) | 5% by weight (on basis of starch) |
| Ammonium Hydroxide | adequate amount. |

A control coating color was prepared by adding 30% paste containing amino phosphoric acid esterification starch to the 70% kaolin suspension according to the same technique as in the control of Example 2 and the same procedure as described in the control of Example 7. The solid content of the resulting control color was 61-62% by weight in the absence of diluting water.

In Example 9, 20 parts by weight of the adhesives including 35% by weight of the granulated starch and 65% by weight of the latex, were added to 100 parts by weight of kaolin. The amount of the granulated starch was directly added to the 70% kaolin suspension in the same manner as in Example 2 and the same procedures as in Example 7, No.5, were carried out thereby yielding the desired coating color, the solid content of which was 62% by weight in the presence of diluting water and 67.4% by weight in the absence of diluting water. The composition of the coating color is briefly shown below:

| Kaolin (UW-90) | 100 parts by weight |
| --- | --- |
| Sodium Polyacrylate | 0.2 parts by weight |
| Starch | } 20 parts by weight |
| Latex |  |
| Calcium Stearate | 1.5 parts by weight |
| Epoxy Derivative Resin (Denacall#PC-1000) | 5% by weight (on basis of starch) |
| Ammonium Hydroxide | adequate amount. |

A control coating color was prepared in the same manner as in that of Example 8.

The experimental results are shown in Table 5, which indicates that the coating colors of Examples 8 and 9 have an extremely low viscosity, respectively, despite a high solid content and that the water retention and the high shear viscosity are improved. Streak and scratch were not observed in the coating process which was carried out by means of a blade coater. The qualities and printability of the coated paper were almost identical to those of the control.

TABLE 5

|  | Example 8 | | Example 9 | | Control | |
| --- | --- | --- | --- | --- | --- | --- |
|  | 1 | 2 | 3 | 4 | 1 | 2 |
| Amount of Adhesives Used | 15 parts | 15 parts | 20 parts | 20 parts | 15 parts | 20 parts |
| Proportion |  |  |  |  |  |  |
| Starch | 35 | 35 | 35 | 35 | 35 | 35 |
| Latex | 65 | 65 | 65 | 65 | 65 | 65 |
| Coating Color |  |  |  |  |  |  |
| Solid Content (%) | 63.1 | 67.7 | 62.3 | 67.4 | 62.6 | 61.4 |
| Brookfield Viscosity (CPS) |  |  |  |  |  |  |
| Just After Preparation (60rpm) | 363 | 1,576 | 479 | 1,508 | 4,140 | 4,500 |
| 24 hrs After Preparation (60rpm) | 514 | 1,970 | 598 | 2,120 | 4.200 | 4.920 |
| HIgh Shear Viscosity (4,400rpm) | 55 | 275 | 30 | 170 | 95 | 109 |
| (8,800rpm) | — | — | 28 | — | — | — |
| pH | 9.1 | 9.1 | 9.0 | 8.9 | 9.5 | 9.2 |
| Water Retention Value (sec) | 19.5 | 26.1 | 23.4 | 27.0 | 27.2 | 30.7 |
| Coating Condition By Blade Coater | ◎ | ◎ | ◎ | ◎ | ◎ | ◎ |
| Coated Paper |  |  |  |  |  |  |
| Coated Amount (g/m$^2$) | 19.6 | — | 20.0 | — | 17.0 | 18.3 |
| Sheet Gloss (%) | 80.9 | — | 79.2 | — | 76.2 | 73.9 |
| Brightness (%) | 79.5 | — | 79.1 | — | 79.5 | 78.9 |
| Opacity (%) | 89.1 | — | 88.6 | — | 88.5 | 87.9 |
| Smoothness (sec) | 3,600 | — | 4,300 | — | 3,700 | 4,400 |
| Air Permeability (sec) | 4,600 | — | 10,000 | — | 5,000 | 12,000 |
| Wet Rub (4 days After) (%) | 98.0 | — | 98.0 | — | 98.0 | 98.0 |

TABLE 5-continued

|  | Example 8 | | Example 9 | | Control | |
| --- | --- | --- | --- | --- | --- | --- |
|  | 1 | 2 | 3 | 4 | 1 | 2 |
| Printabilty of Coated Paper | | | | | | |
| K & N Ink Receptibility (%) | 21.4 | — | 12.0 | — | 21.4 | 11.8 |
| Printed Gloss (%) | 80.4 | — | 89.4 | — | 83.5 | 90.3 |
| Printed Ink Density | 2.27 | — | 2.37 | — | 2.36 | 2.39 |
| ITG Pick Strength (cm/sec) | 93 | — | 106 | — | 82 | 92 |
| RI Pick Strength (Dry) | 3.2 | — | 5 | — | 3.2 | 5 |
| RI Pick Strength (Wet) | 2 | — | 4.1 | — | 1 | 3.9 |

EXAMPLES 10

According to the same technique as in the aforementioned examples, a coating color was prepared, the composition of which is shown in the upper part of Table 6. The coating color was applied to a base paper by means of a test plant bar coater at a coating speed of 70 m/min thereby obtaining coated paper with a coated color amount of 11 g/m² on its each surface. After drying, the coated paper was subjected to a super calender treatment to improve the smoothness and brightness thereof. The qualities of the coating color and coated paper are shown in the middle part and the lower part of Table 6, respectively. It can be seen in Table 6 that both the Brookfield viscosity and the high shear viscosity are superior to those of the control. It is also found that the sheet gloss of the coated paper is particularly excellent. In addition, the coating process using the bar coater showed no evidence of streak or scratch.

TABLE 6

|  | Example 10 | Control |
| --- | --- | --- |
| Composition | | |
| Kaolin (UW-90) | 70 | 70 |
| Calcium carbonate | 30 | 30 |
| Starch | 7* | 7** |
| Latex (JSR#0692) | 13 | 13 |
| Sumirettsu resin #633 | 0.42 | 0.42 |
| Calcium Stearate | 1.5 | 15.5 |
| Ammonium Hydroxide | | |
| pH 9–10 | | |
| Coating Color | | |
| Solid Content | 54.5 | 52.3 |
| Brookfield Viscosity (CPS) | | |
| Just After coating (60rpm) | 85 | 380 |
| 24 hrs After coating (60rpm) | 150 | 455 |
| pH | 9.9 | 9.5 |
| High Shear Viscosity (8,800rpm) | 20.4 | 25.6 |
| Coating Condition By Bar Coater | ◎ | ◎ |
| Coated Paper | | |
| Coated Amount (g/m²) | 11.6 | 12.1 |
| Brightness (%) | 82.5 | 82.1 |
| Opacity (%) | 85.0 | 85.0 |
| Sheet Gloss (%) | 55.2 | 50.3 |
| Smoothness (mmHg) | 23 | 22 |
| Air Permeabilty (mmHg) | 11 | 15 |
| Printed Gloss (%) | 62.3 | 65.3 |
| K & N ink Receptivity | 21.1 | 22.6 |
| IGT Pick Strength (cm/sec) | 113 | 104 |
| RI Pick Strength (Dry) | 4 | 4 |
| (Wet) | 4 | 4 |
| Ink Setting (For 1 minutes) (%) | 40.5 | 39.5 |

Note:
*Enzyme-converted starch
**Aminophosphate esterification starch

The coated paper was printed under the belowmentioned conditions to evaluate the print properties such as an printing operation conditions, picking occurrence, paper dust production, print conditions and the like:

| 1. Printing Machine | Rolandrecoad RZK-3 Type Two Coloring Machine |
| --- | --- |
| 2. Test Board | Fuji Photofilm Co., Ltd. GAP-II |
| 3. Blanket | Kinyo Co., Ltd. Blanket S5300W |
| 4. Ink | Dainippon Ink Co., Ltd. New Champion Superapex S Type |
| 5. Printing Order | Indigo to Red |
| 6. Damping Solution | Industrial Water +5% of EPA+ 0.5% of DH-78(Dainippon Ink Co., ltd.) |
| 7. Printing Press | 15/100 mm between plate cylinder and blanket cylinder; 15/100 mm between blanket cylinder and press cylinder |
| 8. Printing Speed | 5,000 Sheets/hr |
| 9. The number of Printed sheets | 2,000 Sheets. |

Evaluation of the print properties of the coated paper are shown in Table 7, indicating that the coated paper using the coating color according to this invention is the most excellent in light of the total evaluation.

TABLE 7

| | | Printed Papers | | |
| --- | --- | --- | --- | --- |
| Items | E-valu-ation | Example 10 | Control | Reference (Commercial Coated Light-Paper) |
| Operation Condition | | | | |
| Feeder | | 0 | 0 | 0 |
| Feeder Pertinency | 9 | −1 | −2 | 0 |
| Damping Solution | | 0 | 0 | 0 |
| Ink Amount | | 0 | 0 | 0 |
| Picking Occurence | | | | |
| First Cylinder | 20 | −5 | −5 | −10 |
| Second Cylinder | | 0 | −2 | −10 |
| Paper Dust Production | | | | |
| Residue on Feeder | | −0.5 | −0.5 | 0 |
| Residue on Blanket | 17 | −5 | −5 | −5 |
| Residue on Inkroller | | 0 | 0 | 0 |
| Print Condition | | | | |
| Thickness of Printed Ink | | 0 | −5 | −5 |
| Dot Reproduction | 40 | 0 | 0 | −6 |
| Gloss | | 31 7 | −7 | 0 |
| Others | | | | |
| Time Required For Ink Setting | | 0 | 0 | 0 |
| Dimension Stabillity | 14 | 0 | 0 | 0 |
| Delivery | | 0 | 0 | 0 |
| Total Evaluation | 100 | 81.5 | 73.5 | 64 |

The various measurements in the aforementioned examples were carried out according to the following methods:

(1) The viscosity of the coating color was measured at 25° C. and 60 rpm by a Brookfield type viscometer available from Tokyo Keiki Co., LTd., (2) The high shear viscosity (10⁵ dyne-cm) of the coating color was measured at 8800 rpm and 4400 rpm by a Hercules type high shear viscometer, available from Kumagai Riki Co., Ltd., (3) The water retention value of the coating color was measured using No.6 filter paper by the $KMnO_4$ method, (4) The sheet gloss was measured at 75° specular gloss on paper by a Murakami type gloss meter, (5) The brightness was measured using a blue filter by a Murakami type hunter, (6) The opacity was measured using a green filter by a Murakami type hunter, (7) The smoothness (sec) was measured by an Oji Laboratory type smoothness examining machine, (8) The smoothness (mmHg) was measured by a Smoothter, smoothness examining machine, (9) The air permeability (sec) was measured by an Oji type permeability examining machine,

(10) The air permeability (mmHg) was measured by a smoothter permeability examining machine,

(11) The K & N ink receptibity was measured using K & N ink by a reduction rate of brightness,

(12) The printed gloss was measured at 75° specular on the printed side by a RI printing tester,

(13) The printed ink density was based on a reflection density of the printed side prepared by an RI printing tester; The reflection density was measured by a density meter available from Dainippon Screen Co., Ltd.,

(14) The IGT pick strength was measured by a IGT pick strength meter,

(15) The RI pick strength (dry) was evaluated through visual inspection (5 points indicates the most excellent and 1 point the most inferior) after measurement of pick resistance in printing by means of an RI printing meter,

(16) The RI pick strength (wet) was evaluated through visual inspection (5 points indicates the most excellent and 1 point the most inferior) after measurement of wet pick resistance by means of an RI printing tester,

(17) The water resistancy by the Wet Rub method was measured as follows:

Using a abrasion machine available from Taber Co., Ltd., 10 ml of distilled water were added dropwise to the coated surface of the paper to thereby make the surface damp. The resulting damp surface was rubbed by a rubber wheel of 250 g at 10 to 20 revolutions. The coated color on the rubbed surface of the paper was removed with distilled water. One hundred ml of the distilled water containing the removed color coating was measured at 420 nm by a Hirama type spectrophotometer to calculate the amount of coated color washed out of the coated surface of the paper.

(18) The coating color was coated at 600 m/min using a high speed sheet type blade coater available from Kumagai Riki Co., Ltd. The resulting coated surface was visually inspected to evaluate the coating condition using a blade coater by the following basis:

⦾ : Quite Excellent
◎ : Just Excellent
○ : Good
Δ : Ordinary
× : Inferior, and

(19) The coating color was continuously applied to the surface of the paper using a pilot test bar coater. The resulting coated surface of paper was visually inspected to evaluate the coating condition using a bar coater by the abovementioned base.

It is understood that various other modifications will be apparent to and can readily be made by those skilled in the art without departing from the scope and spirit of this invention. Accordingly it is intended that the scope of the following claims be construed as encompassing all the patentable features which are associated with the present invention, including all features which would be treated as equivalents thereof by those skilled in the art to which the invention pertains.

What is claimed is:

1. A coating color for paper, comprising:
   100 parts by weight of pigments;
   about 1 part to about 50 parts by weight of enzymatically converted dry starch in powder or granule form, which contains 20% or less by weight moisture, 2.0% or less by weight crude protein, 1.0% or less by weight crude fat, 1.0% or less by weight crude fiber, 1.0% or less by weight crude ash, 20% or less by weight dextrose equivalent, and having a viscosity of a 30% by weight content suspension thereof of 3000 cp or less; and
   insolubilizers; and water.

2. A coating color according to claim 1, wherein said insolubilizers are at least one selected from the group consisting of dialdehyde compounds, polyalkylene ureas, polyamide ureas, formaldehyde, N-methylol compounds, soluble condensed N-methylol compounds and epoxy compounds.

3. A coating color for paper, comprising:
   100 parts by weight of pigments;
   about 1 part to about 50 parts by weight of enzymatically converted dry starch in powder or granule form, which contains 20% or less by weight moisture, 2.0% or less by weight crude protein, 1.0% or less by weight crude fat, 1.0% or less by weight crude fiber, 1.0% or less by weight crude ash, 20% or less by weight dextrose equivalent, and having a viscosity of a 30% by weight content suspension thereof of 3000 cp or less; and
   insolubilizers;
   synthetic latices;
   auxiliary agents; and water.

4. A coating color according to claim 3, wherein said insolubilizer is at least one selected from the group consisting of dialdehyde compounds, polyalkylene ureas, polyamide ureas, formaldehyde, N-methylol compounds, soluble condensed N-methylol compounds and epoxy compounds.

5. A coating color according to claim 3, wherein said synthetic latices are at least one selected from the group consisting of diene derivative polymers, modified functional group-having diene derivative polymers, acryl derivative polymers, modified functional group-having acryl derivative polymers, vinyl acetate derivative polymers, and modified functional group-having vinyl acetate derivative polymers.

6. A coating color according to claim 3, wherein said auxiliary agents are at least one selected from the group consisting of dispersing agents, leveling agents, foam killers, dystuffs, lubricating agents, insolubilizers and water retention aids.

7. A method for the preparation of a coating color for paper, comprising:
   a step of direct addition of about 1 part to 50 parts by weight of enzymatically converted dry powdered or granulated starch as an adhesive to an aqueous pigment-suspension containing 100 parts by weight of pigment.

8. A method for preparation of a coating color according to claim 7, wherein said starch is prepared by:
   (1) adjusting a starch slurry to a specific gravity ranging from about 15 to about 24 Bé,
   (2) adding alkali to said starch slurry to adjust to a pH of about 6–7,
   (3) adding α-amylase with a concentration ranging from about 0.05% to about 1% by weight to said starch slurry,
   (4) heating the mixture to be impasted to a temperature ranging from about 70° C. to about 100° C.,
   (5) subjecting the resulting paste to an enzymic conversion at a temperature ranging from about 70° C. to about 100° C. for a period ranging from about 0.5 to about 10 hours,
   (6) inactivating said enzyme,
   (7) drying said paste, and
   (8) passing said dry paste through a sieve to thereby yield powdered or granulated paste.

9. A coating color for paper, prepared by the method of claim 7.

10. A coating color for paper, prepared by the method of claim 8.

11. The method for preparation of a coating color for paper as set forth in claim 7, wherein said enzymatically converted dried, powdered, or granulated starch contains 20% or less by weight moisture, 2.0% or less by weight crude protein, 1.0% or less by weight crude fat, 1.0% or less by weight crude fiber, 1.0% or less by weight crude ash, 20% by weight dextrose equivalent, and has a viscosity of a 30% by weight content suspension of 3,000 cp or less.

12. The method for preparation of a coating color for paper, as set forth in claim 11, including at least one insolubilizer selected from the group consisting of dialdehyde compound, polyalkylene-ureas, polyamide-ureas, formaldehyde, N-methylol compounds, soluble condensed N-Methylol compounds and epoxy compounds.

13. The method for preparation of a coating color for paper as set forth in claim 7, including at least one synthetic latice selected from the group consisting of diene derivative polymers, modified functional group-having diene derivative polymers, acryl derivative polymers, modified functional group-having acryl derivative polymers, vinyl acetate derivative polymers, and modified functional group-having vinyl acetate derivative polymers.

14. The method for preparation of a coating color for paper as set forth in claim 7, including at least one auxiliary agent selected from the group consisting of dispersing agents, leveling agents, foam killers, dyestuffs, lubricating agents, insolubilizers, and water retention aids.

* * * * *